United States Patent
Chang (10) Patent No.: US 8,009,239 B2
(45) Date of Patent: Aug. 30, 2011

(54) STEREOSCOPIC DISPLAY DEVICE, SYSTEM AND METHOD

(75) Inventor: Yao-Tsung Chang, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 295 days.

(21) Appl. No.: 12/432,352

(22) Filed: Apr. 29, 2009

(65) Prior Publication Data

US 2010/0066927 A1    Mar. 18, 2010

(30) Foreign Application Priority Data

Sep. 18, 2008    (TW) ............................. 97135795 A (51) Int. Cl.
*G02F 1/133*    (2006.01)
(52) U.S. Cl. ......................................... 349/15
(58) Field of Classification Search ..................... 349/15
See application file for complete search history.

(56) References Cited

U.S. PATENT DOCUMENTS

| | | | | |
|---|---|---|---|---|
| 5,875,055 | A * | 2/1999 | Morishima et al. | 359/465 |
| 5,894,361 | A * | 4/1999 | Yamazaki et al. | 349/15 |
| 5,940,150 | A * | 8/1999 | Faris et al. | 349/16 |
| 6,912,018 | B2 * | 6/2005 | Faris et al. | 349/16 |

FOREIGN PATENT DOCUMENTS

| | | |
|---|---|---|
| JP | 07-005325 | 1/1995 |
| JP | 2006-119545 | 5/2006 |

OTHER PUBLICATIONS

Chinese Office Action for Chinese Patent Application No. 200810169864.0 mailed on Apr. 14, 2011.

* cited by examiner

*Primary Examiner* — Sung H Pak
(74) *Attorney, Agent, or Firm* — Turocy & Watson, LLP (57) ABSTRACT

A stereoscopic display device includes an inner polarizer, an outer polarizer, and a display substrate panel interposed between the inner and outer polarizers. The inner polarizer has first and second polarization regions arranged alternately and having a 90-degree polarization angle difference. The outer polarizer has third and fourth polarization regions corresponding in position to the first and second polarization regions. The third and first polarization regions have a 90-degree polarization angle difference. The fourth and second polarization regions have a 90-degree polarization angle difference. Light passing through the first polarization regions, the display substrate panel, and the third polarization regions can pass through one lens of a pair of stereoscopic glasses, whereas light passing through the second polarization regions, the display substrate panel, and the fourth polarization regions can pass through the other lens of the stereoscopic glasses.

18 Claims, 6 Drawing Sheets

STEREOSCOPIC DISPLAY DEVICE, SYSTEM AND METHOD

CROSS-REFERENCE TO RELATED APPLICATION

This application claims priority of Taiwanese Application No. 097135795, filed on Sep. 18, 2008.

BACKGROUND OF THE INVENTION

1. Field of the Invention

The invention relates to a stereoscopic display technique for a liquid crystal display device, more particularly to a stereoscopic display technique that can be used to produce stereoscopic effects by modifying polarizers of a liquid crystal display device.

2. Description of the Related Art

In order to enable a flat screen to present a stereoscopic effect, the principle of stereoscopic vision has to be employed. In other words, an image intended to be seen with the left eye should be transmitted to the left eye, and an image intended to be seen with the right eye should be transmitted to the right eye so that, after processing by the brain, stereoscopic images will be formed in the brain.

For three-dimensional motion pictures, they can be produced using the principle of polarization imaging, i.e., using two cameras to capture left and right eye images from two slightly different angles, and respectively subjecting the left and right images to horizontal polarization processing and vertical polarization processing before they are projected onto a screen. A viewer intending to see the stereoscopic movie needs to wear stereoscopic glasses. The left lens in the stereoscopic glasses is a horizontally polarized lens, and the right lens in the stereoscopic glasses is a vertically polarized lens. When light passes through the two polarized lenses, since the polarized lenses filter out light of different polarization directions and permit passage of similarly polarized light only, the horizontally polarized left eye image can only pass through the horizontally polarized lens, and the vertically polarized right eye image can only pass through the vertically polarized lens, so that the left eye image is presented to the left eye of the viewer and the right eye image is presented to the right eye of the viewer, thereby resulting in a visually stereoscopic effect.

Figure 1:
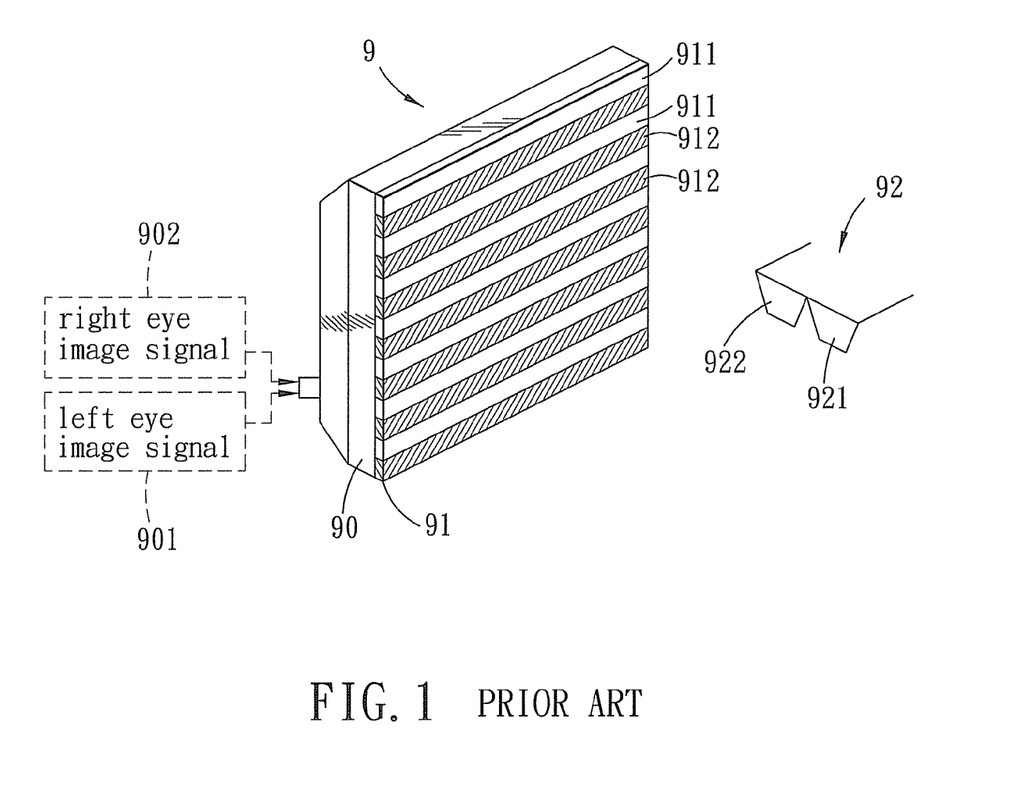
FIG. 1 is a schematic diagram of a conventional stereoscopic display system.

To produce a stereoscopic effect on a liquid crystal display, the working principle is similar to that described in connection with the making of three-dimensional motion pictures. A conventional stereoscopic display system 9 is shown in FIG. 1. The system 9 includes a liquid crystal screen 90, a micro retardation film 91 attached to the liquid crystal screen 90, and stereoscopic glasses 92. The liquid crystal screen 90 receives a left eye image signal 901 and a right eye image signal 902, displays the left eye image signal 901 in odd-number rows of pixels, and displays the right eye image signal 902 in even-number rows of pixels. The micro retardation film 91 has a plurality of interlaced horizontal first and second phase delay regions 911, 912. A difference in phase delay between the first phase delay region 911 and the second phase delay region 912 is one half of a wavelength. In addition, the first phase delay regions 911 correspond in position to the odd-number pixel rows of the liquid crystal screen 90, whereas the second phase delay regions 912 correspond in position to the even-number pixel rows.

On the other hand, a left eye lens 921 of the stereoscopic glasses 92 is designed to permit passage of light passing through the first phase delay regions 911, whereas a right eye lens 922 is designed to permit passage of light passing through the second phase delay regions 912. Thus, the left eye image signal 901 is sent from the odd-number pixel rows through the first phase delay regions 911 of the micro retardation film 91 and further through the left eye lens 921 so as to be received by the left eye, and the right eye image signal 902 is sent from the even-number pixel rows through the second phase delay regions 912 of the micro retardation film 91 and further through the right eye lens 922 so as to be received by the right eye, thereby enabling the viewer to view stereoscopic images.

However, since the conventional stereoscopic display system 9 utilizes the liquid crystal screen 90 that has the micro phase retardation film 91 additionally attached thereto in order to produce a stereoscopic display effect in conjunction with the use of the stereoscopic glasses 92, the manufacture of the stereoscopic display system 9, in comparison with the manufacture of a conventional liquid crystal display screen without the micro phase retardation film 91, requires addition or change of processing steps and adjustment of production line equipment, thereby resulting in increased manufacturing costs and inconvenience.

SUMMARY OF THE INVENTION

Therefore, an object of the present invention is to provide a stereoscopic display device, system, and method capable of achieving a stereoscopic display effect without the need to change the manufacturing process or production equipment so as to overcome the problems associated with the prior art.

Another object of the present invention is to provide a stereoscopic display device, system, and method capable of simulating a visual effect of relatively high resolution.

Accordingly, the stereoscopic display system of this invention includes a stereoscopic display device and stereoscopic glasses. The stereoscopic display device includes an inner polarizer, an outer polarizer, and a display substrate panel interposed between the inner and outer polarizers. The inner polarizer has a plurality of alternately arranged first and second polarization regions. The first polarization regions have a polarization angle of $\alpha+90$ degrees. The second polarization regions have a polarization angle of $\alpha$ degrees. The outer polarizer has a plurality of alternately arranged third polarization regions and fourth polarization regions. The third polarization regions correspond in position to the first polarization regions of the inner polarizer and have a polarization angle of $\alpha$ degrees. The fourth polarization regions correspond in position to the second polarization regions of the inner polarizer and have a polarization angle of $\alpha+90$ degrees.

The display substrate panel has a plurality of pixels. The pixels are divided into a first pixel group and a second pixel group. The first polarization regions of the inner polarizer and the third polarization regions of the outer polarizer correspond in position to the first pixel group. The second polarization regions of the inner polarizer and the fourth polarization regions of the outer polarizer correspond in position to the second pixel groups. The first pixel group is for displaying a left eye image transmitted from the outside, and the second pixel group is for displaying a right eye image transmitted from the outside. Since the display substrate panel includes a pair of glass substrates and a liquid crystal layer between the glass substrates, a light beam portion that has a polarization angle of $\alpha+90$ degrees after passing through the first polarization regions of the inner polarizer can pass through the display substrate panel and further pass through the third polarization regions of the outer polarizer as $\alpha$-degree polarized light, and a light beam portion that has a polarization angle of α degrees after passing through the second polarization regions of the inner polarizer can pass through the display substrate panel and further pass through the fourth polarization regions of the outer polarizer as (α+90)-degree polarized light.

The alternating arrangements of the first and second polarization regions of the inner polarizer and of the third and fourth polarization regions of the outer polarizer may be an interlaced arrangement of alternating rows or columns, or a checkered arrangement, and the first pixel group and the second pixel group are correspondingly arranged.

The present invention is also directed to processing of the left eye image signal for display by the first pixel group and of the right eye image signal for display by the second pixel group such that the color displayed by each of the pixels is determined by both the original color of the respective pixel and the colors of adjoining pixels. Thus, the colors of the second pixel group which normally cannot be viewed with the left eye have a contribution to the colors of the first pixel group, and the colors of the first pixel group which normally cannot be viewed with the right eye have a contribution to the second pixel group, so that the left or right eye image presented to the corresponding eye of a wearer of the stereoscopic glasses is closer to the whole image, thereby simulating a visual effect of relatively high resolution.

The stereoscopic display method according to the present invention includes the following steps:

(a) generating a light beam;

(b) causing a left eye image signal and a right eye image signal to be displayed on a display substrate panel having a liquid crystal layer;

(c) causing the light beam to pass through an inner polarizer having a plurality of alternately arranged first and second polarization regions, the first polarization regions having a polarization angle of α+90 degrees, the second polarization regions having a polarization angle of α degrees, the light beam passing through the inner polarizer being split into a plurality of (α+90)-degree polarized beam portions and a plurality of α-degree polarized beam portions in an alternating pattern;

(d) causing the polarized beam portions to pass through the liquid crystal layer of the display substrate panel such that the (α+90)-degree polarized beam portions are rotated 90 degrees to become α-degree polarized light and that the α-degree polarized beam portions are rotated 90 degrees to become (α+90)-degree polarized light; and (e) causing the α-degree polarized light and the (α+90)-degree polarized light to pass through an outer polarizer having a plurality of alternately arranged third polarization regions and fourth polarization regions, the third polarization regions corresponding in position to the first polarization regions of the inner polarizer and having a polarization angle of α degrees, the fourth polarization regions corresponding in position to the second polarization regions and having a polarization angle of α+90 degrees.

The effect of the present invention resides in that the objective of stereoscopic display can be achieved by providing the inner and outer polarizers with specially designed polarization regions.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Figure 2:
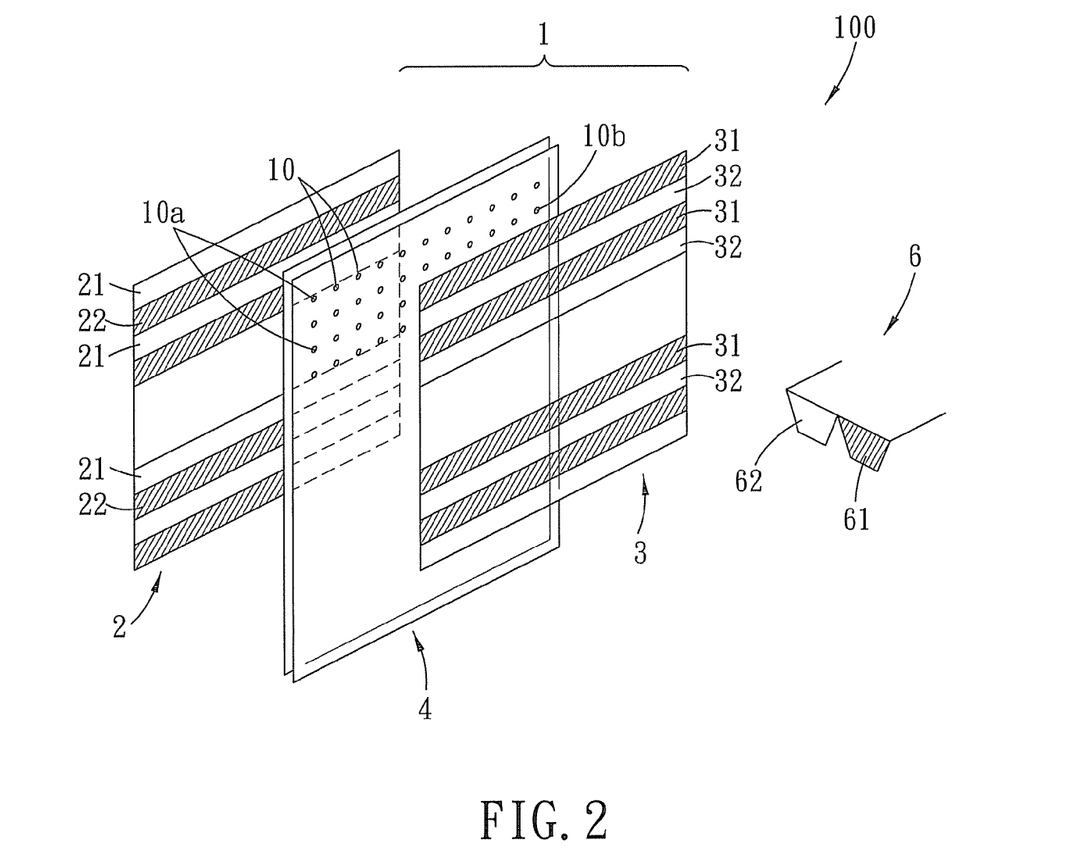
FIG. 2 is a schematic diagram of the first preferred embodiment of a stereoscopic display system according to the invention.

FIG. 2 schematically illustrates a stereoscopic display system 100 according to the invention. The stereoscopic display system 100 includes a stereoscopic display device 1 and stereoscopic glasses 6. The stereoscopic display device 1 is depicted in detail in FIG. 3, and includes a backlight module 5 for emitting a light beam, an inner polarizer 2 disposed proximate to the backlight module 5 for receiving the light beam emitted by the backlight module 5, an outer polarizer 3 spaced apart from the inner polarizer 2, and a display substrate panel 4 interposed between the inner and outer polarizers 2, 3. The display substrate panel 4 is a component currently used in a conventional liquid crystal display, and includes, arranged in sequence from the outside to the inside, a pair of glass substrates 41 having pixel electrodes (not shown) attached thereto, a pair of color filters 42, a pair of alignment films 43, and a liquid crystal layer 40 sealed in the middle.

The inner polarizer 2 of this embodiment is illustrated in FIG. 2. The inner polarizer 2 is partitioned into a plurality of rows, and has a plurality of interlaced first and second polarization regions 21, 22. The first polarization regions are odd-number rows with a polarization angle of α+90 degrees. The second polarization regions 22 are even-number rows with a polarization angle of α degrees.

The outer polarizer 3 is likewise partitioned into a plurality of rows, and has a plurality of interlaced third and fourth polarization regions 31, 32. The third polarization regions 31 correspond in position to the first polarization regions 21 of the inner polarizer 2, i.e., being odd-number rows, and have a polarization angle of α degrees. The fourth polarization regions 32 correspond in position to the second polarization regions 22 of the inner polarizer 2, i.e., being even-number rows, and have a polarization angle of α+90 degrees.

The display substrate panel 4 has a plurality of pixels 10. The pixels 10 are divided into a first pixel group (10a) and a second pixel group (10b). The first polarization regions 21 of the inner polarizer 2 and the third polarization regions 31 of the outer polarizer 3 correspond in position to the first pixel group (10a), i.e., the first pixel group (10a) of the display substrate panel 4 of this embodiment includes odd-number pixel rows. The second polarization regions 22 of the inner polarizer 2 and the fourth polarization regions 32 of the outer polarizer 3 correspond in position to the second pixel group (10b), i.e., the second pixel group (10b) of the display substrate panel 4 of this embodiment includes even-number pixel rows. A left eye image signal (not shown) transmitted from the outside is displayed by the first pixel group (10a). A right eye image signal (not shown) transmitted from the outside is displayed by the second pixel group (10b). As for mechanisms to display specific image signals in specific pixel groups, various currently available display techniques may be employed, which will not be described in detail herein for the sake of brevity.

Figure 3:
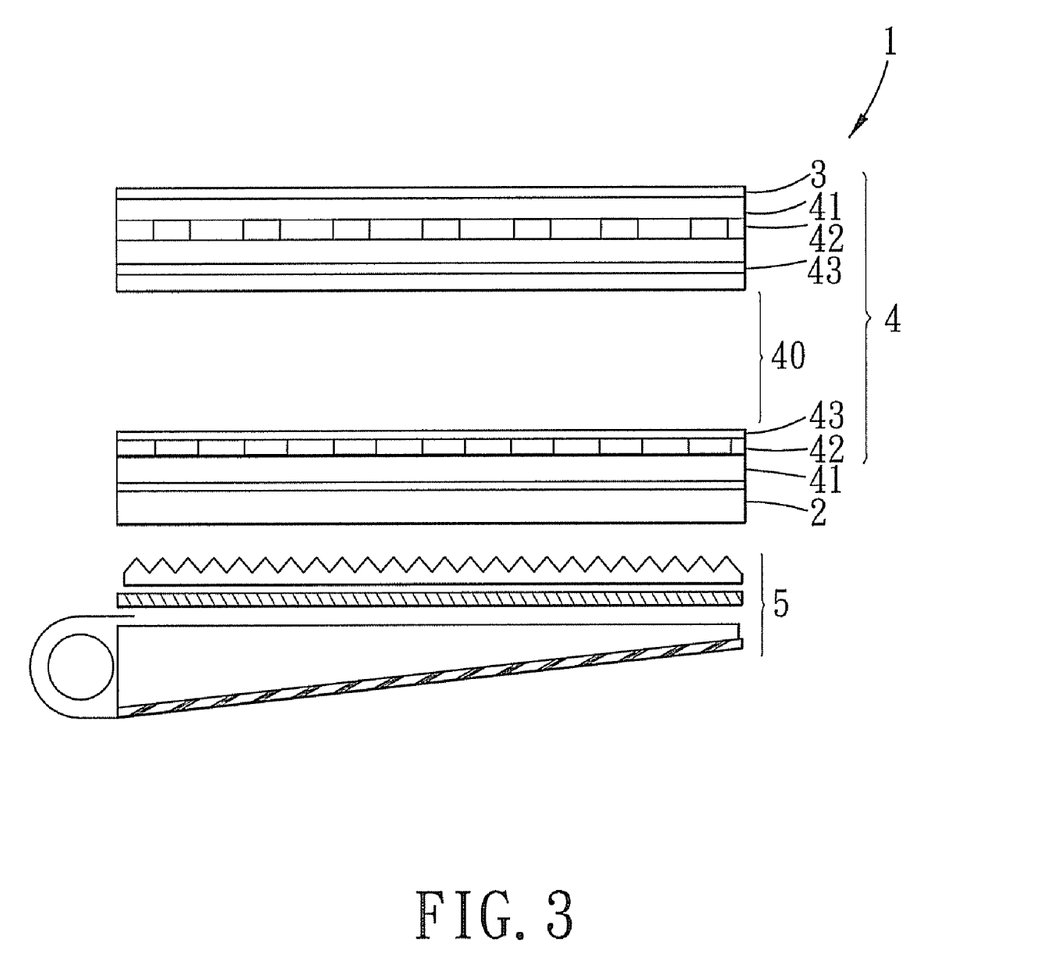
FIG. 3 is a schematic side view of a stereoscopic display device according to the invention.

With the above configuration, a portion of the light beam passing through the first polarization regions 21 of the inner polarizer 2 will become polarized light of α+90 degrees. When the polarized light passes through the display substrate panel 4, it travels through gaps among liquid crystal molecules and is thereby rotated 90 degrees to become polarized light of α degrees, which further passes through the third polarization regions 31 (with a polarization angle of α degrees) of the outer polarizer 3. Similarly, a portion of the light beam passing through the second polarization regions 22 of the inner polarizer 2 will become polarized light of α degrees. When such polarized light passes through the display substrate panel 4, it travels through gaps among the liquid crystal molecules and is thereby rotated 90 degrees to become polarized light of α+90 degrees, which further passes through the fourth polarization regions 32 (with a polarization angle of α+90 degrees) of the outer polarizer 3.

Since the stereoscopic glasses 6 of this embodiment include a first lens 61 for wearing on the left eye of a wearer and a second lens 62 for wearing on the right eye of the wearer, and since the first lens 61 is a polarized lens permitting passage of light polarized at α degrees therethrough and the second lens 62 is a polarized lens permitting passage of light polarized at α+90 degrees therethrough, the first lens 61 only permits passage of the α-degree polarized light that passed through the third polarization regions 31 of the outer polarizer 3, and the second lens 62 only permits passage of the (α+90)-degree polarized light that passed through the fourth polarization regions 32 of the outer polarizer 3. Thus, the left eye of the wearer of the stereoscopic glasses 6 can see the left eye image signal displayed by the first pixel group (10a) and cannot see the right eye image signal displayed by the second pixel group (10b), and the right eye of the wearer can see the right eye image signal displayed by the second pixel group (10b) and cannot see the left eye image signal displayed by the first pixel group (10a), whereby the wearer wearing the stereoscopic glasses 6 can view stereoscopic images.

Figure 4:
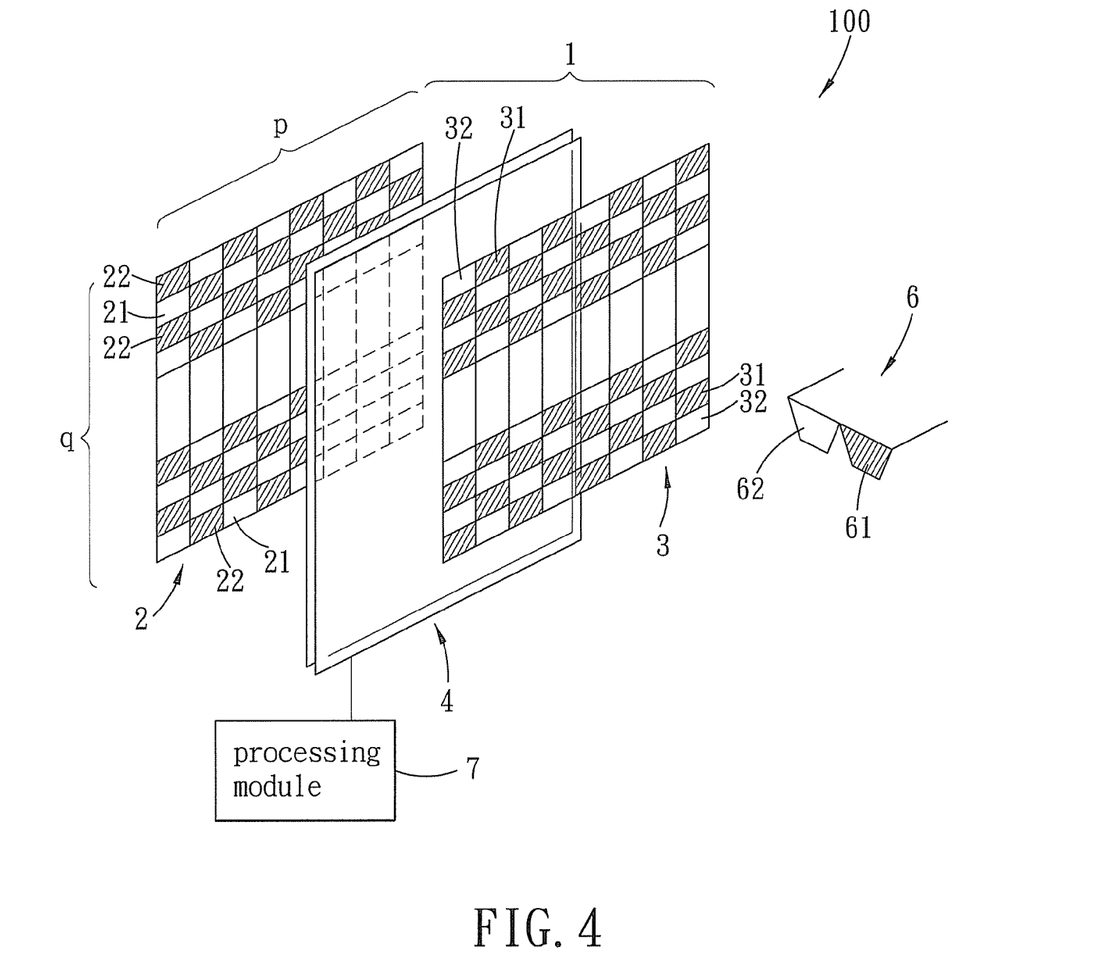
FIG. 4 is a schematic diagram of the second preferred embodiment of a stereoscopic display system according to the invention.
Figure 5:
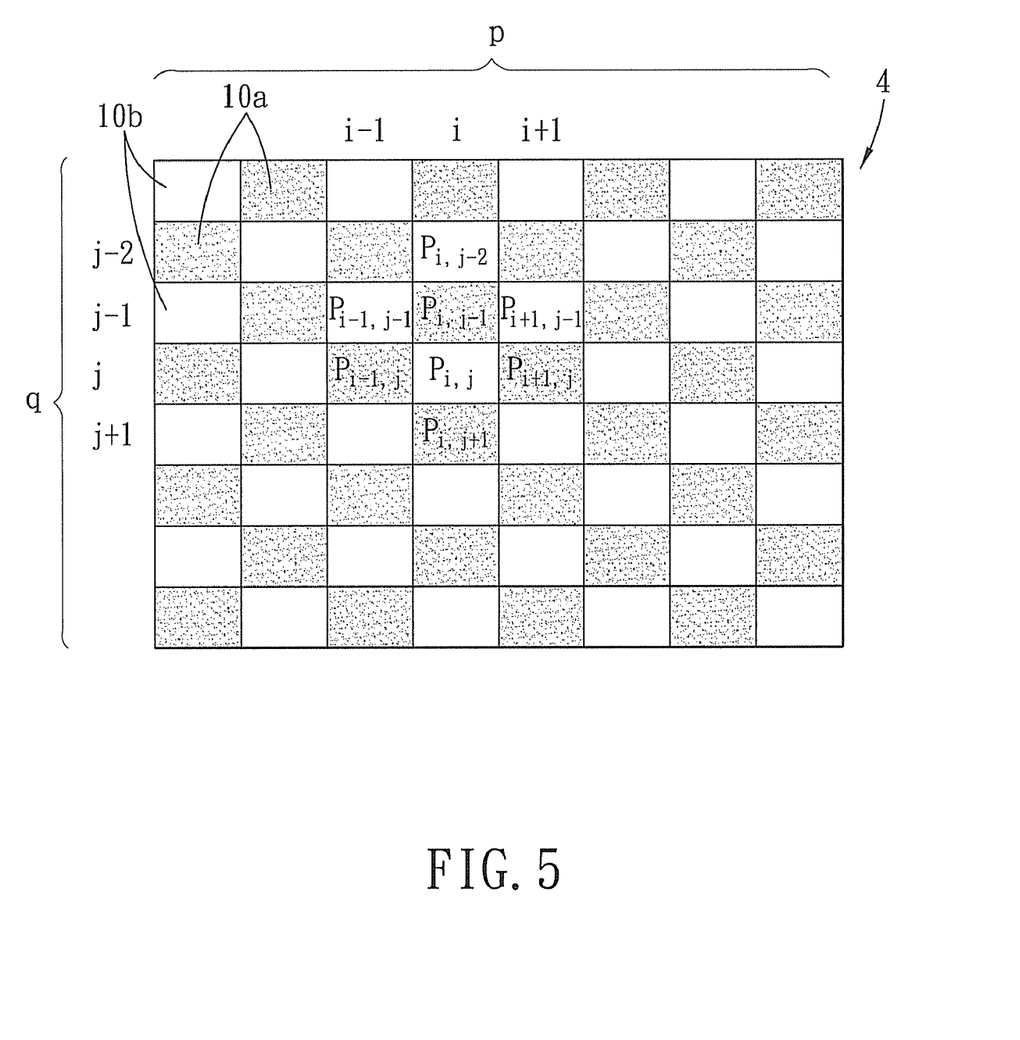
FIG. 5 is a schematic diagram to illustrate pixels of a display substrate panel.

Referring to FIGS. 4 and 5, the second preferred embodiment of a stereoscopic display system 100 according to the invention differs from the first preferred embodiment in the configurations of the inner and outer polarizers 2, 3. In this embodiment, the inner polarizer 2 corresponds to the pixels of the display substrate panel 4 and is partitioned into p×q (e.g., 1024×768) cells $S_{ij}$, where i represents the $i^{th}$ column, and j represents the $j^{th}$ row. The first polarization regions 21 are composed of cells $S_{ij}$ where sum of i+j is an odd number. The second polarization regions 22 are composed of cells $S_{ij}$ where sum of i+j is an even number. The display substrate panel 4 has altogether p×q pixels $P_{ij}$, where i represents the $i^{th}$ column, and j represents the $j^{th}$ row. The first pixel group (10a) is composed of pixels $P_{ij}$ where sum of i+j is an odd number. The second pixel group (10b) is composed of pixels $P_{ij}$ where sum of i+j is an even number.

Thus, the light beam portion passing through the first polarization regions 21 of the inner polarizer 2 becomes (α+90)-degree polarized light, which becomes α-degree polarized light after passing through the display substrate panel 4 for further passage through the third polarization regions 31 of the outer polarizer 3. Similarly, the light beam portion passing through the second polarization regions 22 of the inner polarizer 2 becomes α-degree polarized light, which becomes (α+90)-degree polarized light after passing through the display substrate panel 4 for further passage through the fourth polarization regions 32 of the outer polarizer 3. Hence, the left eye of the wearer of the stereoscopic glasses 6 receives the light beam portion passing through the first lens 61 (α-degree polarized light) so that it can see the left eye image signal displayed by the first pixel group (10a), and the right eye of the wearer receives the light beam portion passing through the second lens 62 ((α+90)-degree polarized light) so that it can see the right eye image signal displayed by the second pixel group (10b), whereby the wearer can view stereoscopic images.

In addition, in order to simulate visual effects of relatively high resolution, the stereoscopic display system 100 of this embodiment further includes a processing module 7 coupled to the display substrate panel 4. The processing module 7 performs computational processing with respect to the color displayed by each of the pixels $P_{ij}$ so that the color to be displayed by each pixel $P_{ij}$ is determined by both the original color of the pixel and colors of adjoining pixels.

In this embodiment, the color to be displayed by each pixel P'ij is determined using the following equation:

$$P'_{i,j} = a_1 * P_{i,j} + a_2 * P_{i,j-1} + a_3 * P_{i,j+1} + a_4 * P_{i-1,j} + a_5 * P_{i+1,j}$$

where $a_1 = 0.5$ and $a_2 = a_3 = a_4 = a_5 = 0.125$ so as to satisfy a preferred requirement that $a_1 + a_2 + a_3 + a_4 + a_5 = 1$ and $a_1$ is greater than each of $a_2$, $a_3$, $a_4$ and $a_5$. Furthermore, since the color to be displayed by each pixel $P'_{i,j}$ is a combination of red ($R'_{i,j}$), green ($G'_{i,j}$), and blue ($B'_{i,j}$), the detailed equations are as follows:

$$P'_{i,j} = R'_{i,j} + G'_{i,j} + B'_{i,j}$$

$$R'_{i,j} = 0.5 * R_{i,j} + 0.125 * (R_{i,j-1} + R_{i,j+1} + R_{i-1,j} + R_{i+1,j})$$

$$G'_{i,j} = 0.5 * G_{i,j} + 0.125 * (G_{i,j-1} + G_{i,j+1} + G_{i-1,j} + G_{i+1,j})$$

$$B'_{i,j} = 0.5 * B_{i,j} + 0.125 * (B_{i,j-1} + B_{i,j+1} + B_{i-1,j} + B_{i+1,j})$$

Hence, originally, each of the left and right eyes is presented with only half of the image (i.e., the first pixel group (10a) or the second pixel group (10b)). However, after computational processing by the processing module 7, each pixel $P_{ij}$ will have colors with contributions from adjoining pixels. Therefore, the image presented to each of the left and right eyes can be closer to the whole image.

In other embodiments of this invention, the inner and outer polarizers 2, 3 are not limited to be partitioned into rows, as in the first preferred embodiment, or into cells, as in the second preferred embodiment, and may be partitioned into, e.g., a plurality of columns, with the first and second pixel groups (10a, 10b) of the display substrate panel 4 correspondingly configured to be pixel columns. As long as the first and second polarization regions 21, 22 are arranged alternately, and the third and fourth polarization regions 31, 32 of the outer polarizer 3 respectively correspond in position, and are complementary in polarization angle, to the first and second polarization regions 21, 22 of the inner polarizer 2, with the first and second pixel groups (10a, 10b) corresponding in position to the first and second polarization regions 21, 22 of the inner polarizer 2 to respectively display the left and right eye image signals, such should be deemed to fall within the technical concept of the invention.

Figure 6:
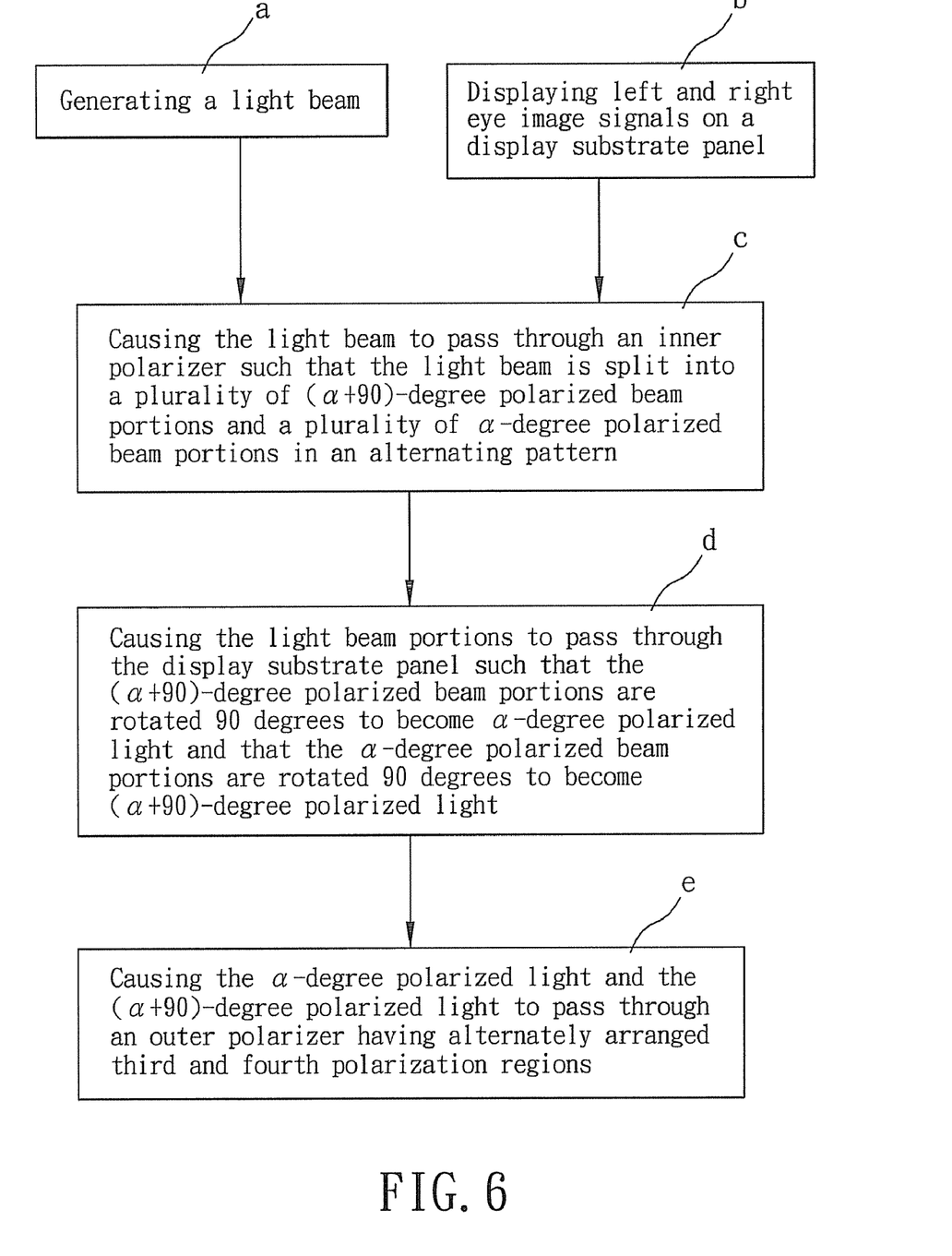
FIG. 6 is a flowchart to illustrate a stereoscopic display method according to the present invention.

With reference to FIG. 6, in conjunction with FIGS. 2 to 5, a stereoscopic display method that can be executed by the stereoscopic display system 100 according to the invention includes the following steps:

(a) generating a light beam;

(b) causing a left eye image signal and a right eye image signal to be displayed on a display substrate panel 4 having a liquid crystal layer 40;

(c) causing the light beam to pass through an inner polarizer 2 having a plurality of alternately arranged first and second polarization regions 21, 22, the first polarization regions 21 having a polarization angle of α+90 degrees, the second polarization regions 22 having a polarization angle of α degrees, the light beam passing through the inner polarizer 2 being split into a plurality of (α+90)-degree polarized beam portions and a plurality of α-degree polarized beam portions in an alternating pattern;

(d) causing the polarized beam portions to pass through the liquid crystal layer 40 of the display substrate panel 4 such that the (α+90)-degree polarized beam portions are rotated 90 degrees to become α-degree polarized light and that the α-degree polarized beam portions are rotated 90 degrees to become (α+90)-degree polarized light; and (e) causing the α-degree polarized light and the (α+90)-degree polarized light to pass through an outer polarizer 3 having a plurality of alternately arranged third polarization regions 31 and fourth polarization regions 32, the third polarization regions 31 corresponding in position to the first polarization regions 21 of the inner polarizer 2 and having a polarization angle of α degrees, the fourth polarization regions 32 corresponding in position to the second polarization regions 22 and having a polarization angle of α+90 degrees.

In step (b), the left eye image signal is displayed by a first pixel group (10a) of the display substrate panel 4, and the right eye image signal is displayed by a second pixel group (10b) of the display substrate panel 4. The first pixel group (10a) corresponds in position to the first polarization regions 21 of the inner polarizer 2 and the third polarization regions 31 of the outer polarizer 3. The second pixel group (10b) corresponds in position to the second polarization regions 22 of the inner polarizer 2 and the fourth polarization regions 32 of the outer polarizer 3.

Furthermore, in step (b), the colors of the left and right eye image signals as displayed by pixels in the first and second pixel groups (10a, 10b) of the display substrate panel 4 are subjected to the above-described computational processing such that the color displayed by each of the pixels is determined by both the original color of the respective pixel and the colors of adjoining pixels.

In sum, since current display devices have an inner polarizer and an outer polarizer, and since the stereoscopic display system 100 of this invention is directed to providing the inner and outer polarizers 2, 3 of specific configurations to replace traditional polarizers for producing a stereoscopic display effect so that the wearer of the stereoscopic glasses 6 can view stereoscopic images, compared to conventional liquid crystal display devices, there is no need to modify the manufacturing process or adjust production line equipment in the manufacture of the stereoscopic display device 1 of the invention.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A stereoscopic display device comprising:
    an inner polarizer having a plurality of alternately arranged first and second polarization regions, said first polarization regions having a polarization angle of α+90 degrees, said second polarization regions having a polarization angle of α degrees;
    an outer polarizer having a plurality of alternately arranged third polarization regions and fourth polarization regions, said third polarization regions corresponding in position to said first polarization regions of said inner polarizer and having a polarization angle of α degrees, said fourth polarization regions corresponding in position to said second polarization regions of said inner polarizer and having a polarization angle of α+90 degrees; and
    a display substrate panel interposed between said inner and outer polarizers, a light beam portion that has a polarization angle of α+90 degrees after passing through said first polarization regions of said inner polarizer passing through said display substrate panel and further passing through said third polarization regions of said outer polarizer as α-degree polarized light, a light beam portion that has a polarization angle of α degrees after passing through said second polarization regions of said inner polarizer passing through said display substrate panel and further passing through said fourth polarization regions of said outer polarizer as (α+90)-degree polarized light.

2. The stereoscopic display device according to claim 1, wherein said display substrate panel has a plurality of pixels, said pixels being divided into a first pixel group and a second pixel group, said first polarization regions of said inner polarizer and said third polarization regions of said outer polarizer corresponding in position to said first pixel group, said second polarization regions of said inner polarizer and said fourth polarization regions of said outer polarizer corresponding in position to said second pixel group.

3. The stereoscopic display device according to claim 2, wherein said first pixel group of said display substrate panel is for displaying a left eye image transmitted from the outside, and said second pixel group is for displaying a right eye image transmitted from the outside.

4. The stereoscopic display device according to claim 1, wherein said inner polarizer is partitioned into a plurality of rows, said first polarization regions being odd-number ones of said rows, said second polarization regions being even-number ones of said rows.

5. The stereoscopic display device according to claim 2, wherein said first pixel group of said display substrate panel includes odd-number pixel rows, and said second pixel group thereof includes even-number pixel rows.

6. The stereoscopic display device according to claim 1, wherein said inner polarizer is partitioned into a plurality of columns, said first polarization regions being odd-number ones of said columns, said second polarization regions being even-number ones of said columns.

7. The stereoscopic display device according to claim 2, wherein said first pixel group of said display substrate panel includes odd-number pixel columns, and said second pixel group thereof includes even-number pixel columns.

8. The stereoscopic display device according to claim 1, wherein said inner polarizer is partitioned into p×q cells $S_{ij}$, where i represents an $i^{th}$ column, and j represents a $j^{th}$ row, said first polarization regions being composed of cells $S_{ij}$ where sum of i+j is an odd number, said second polarization regions being composed of cells $S_{ij}$ where sum of i+j is an even number.

9. The stereoscopic display device according to claim 2, wherein said display substrate panel has altogether p×q pixels $P_{ij}$, where i represents an $i^{th}$ column, and j represents a $j^{th}$ row, said first pixel group being composed of pixels $P_{ij}$ where sum of i+j is an odd number, said second pixel group being composed of pixels P where sum of i+j is an even number.

10. The stereoscopic display device according to claim 9, further comprising a processing module to determine a color to be displayed by each of the pixels $P_{ij}$ with reference to an original color of the respective pixel and colors of adjoining ones of the pixels.

11. The stereoscopic display device according to claim 10, wherein said processing module determines the color to be displayed by a pixel P' ij according to the following equation:

$$P'_{i,j}=a_1*P_{i,j}+a_2*P_{i,j-1}+a_3*P_{i,j+1}+a_4*P_{i-1,j}+a_5*P_{i+1,j}$$

where $a_1+a_2+a_3+a_4+a_5=1$ and $a_1$ is greater than each of $a_2$, $a_3$, $a_4$ and $a_5$.

12. The stereoscopic display device according to claim 1, wherein said display substrate panel includes a pair of glass substrates, and a liquid crystal layer between said glass substrates.

13. The stereoscopic display device according to claim 1, further comprising a backlight module, said inner polarizer being disposed proximate to said backlight module to receive the light beam portions from said backlight module.

14. A stereoscopic display system, comprising:
a stereoscopic display device including
an inner polarizer having a plurality of alternately arranged first and second polarization regions, said first polarization regions having a polarization angle of α+90 degrees, said second polarization regions having a polarization angle of α degrees,
an outer polarizer having a plurality of alternately arranged third polarization regions and fourth polarization regions, said third polarization regions corresponding in position to said first polarization regions of said inner polarizer and having a polarization angle of α degrees, said fourth polarization regions corresponding in position to said second polarization regions of said inner polarizer and having a polarization angle of α+90 degrees, and
a display substrate panel interposed between said inner and outer polarizers, a light beam portion that has a polarization angle of α+90 degrees after passing through said first polarization regions of said inner polarizer passing through said display substrate panel and further passing through said third polarization regions of said outer polarizer as α-degree polarized light, a light beam portion that has a polarization angle of α degrees after passing through said second polarization regions of said inner polarizer passing through said display substrate panel and further passing through said fourth polarization regions of said outer polarizer as (α+90)-degree polarized light; and
stereoscopic glasses including first and second lenses, said first lens permitting passage of α-degree polarized light therethrough, said second lens permitting passage of (α+90)-degree polarized light therethrough.

15. A stereoscopic display method, comprising:
(a) generating a light beam;
(b) causing a left eye image signal and a right eye image signal to be displayed on a display substrate panel having a liquid crystal layer;
(c) causing the light beam to pass through an inner polarizer having a plurality of alternately arranged first and second polarization regions, the first polarization regions having a polarization angle of (α+90 degrees, the second polarization regions having a polarization angle of α degrees, the light beam passing through the inner polarizer being split into a plurality of (α+90)-degree polarized beam portions and a plurality of α-degree polarized beam portions in an alternating pattern;
(d) causing the polarized beam portions to pass through the liquid crystal layer of the display substrate panel such that the (α+90)-degree polarized beam portions are rotated 90 degrees to become α-degree polarized light and that the α-degree polarized beam portions are rotated 90 degrees to become (α+90)-degree polarized light; and
(e) causing the α-degree polarized light and the (α+90)-degree polarized light to pass through an outer polarizer having a plurality of alternately arranged third polarization regions and fourth polarization regions, the third polarization regions corresponding in position to the first polarization regions of the inner polarizer and having a polarization angle of α degrees, the fourth polarization regions corresponding in position to the second polarization regions and having a polarization angle of α+90 degrees.

16. The stereoscopic display method according to claim 15, wherein, in step (b), the left eye image signal is displayed by a first pixel group of the display substrate panel and the right eye image signal is displayed by a second pixel group of the display substrate panel, the first pixel group corresponding in position to the first polarization regions of the inner polarizer and the third polarization regions of the outer polarizer, the second pixel group corresponding in position to the second polarization regions of the inner polarizer and the fourth polarization regions of the outer polarizer.

17. The stereoscopic display method according to claim 16, wherein, in step (b), colors of the left and right eye image signals as displayed by pixels in the first and second pixel groups of the display substrate panel are subjected to computational processing such that the color displayed by each of the pixels is determined with reference to an original color of the respective pixel and colors of adjoining ones of the pixels.

18. The stereoscopic display method according to claim 17, wherein the color to be displayed by a pixel $P'_{i,j}$ is determined using the following equation, where i represents an $i^{th}$ column, and j represents a $j^{th}$ row:

$$P'_{i,j}=a_1*P_{i,j}+a_2*P_{i,j-1}+a_3*P_{i,j+1}+a_4*P_{i-1,j}+a_5*P_{i+1,j}$$

where $a_1+a_2+a_3+a_4+a_5=1$ and $a_1$ is greater than each of $a_2$, $a_3$, $a_4$ and $a_5$.

* * * * *